United States Patent Office 3,515,968
Patented June 2, 1970

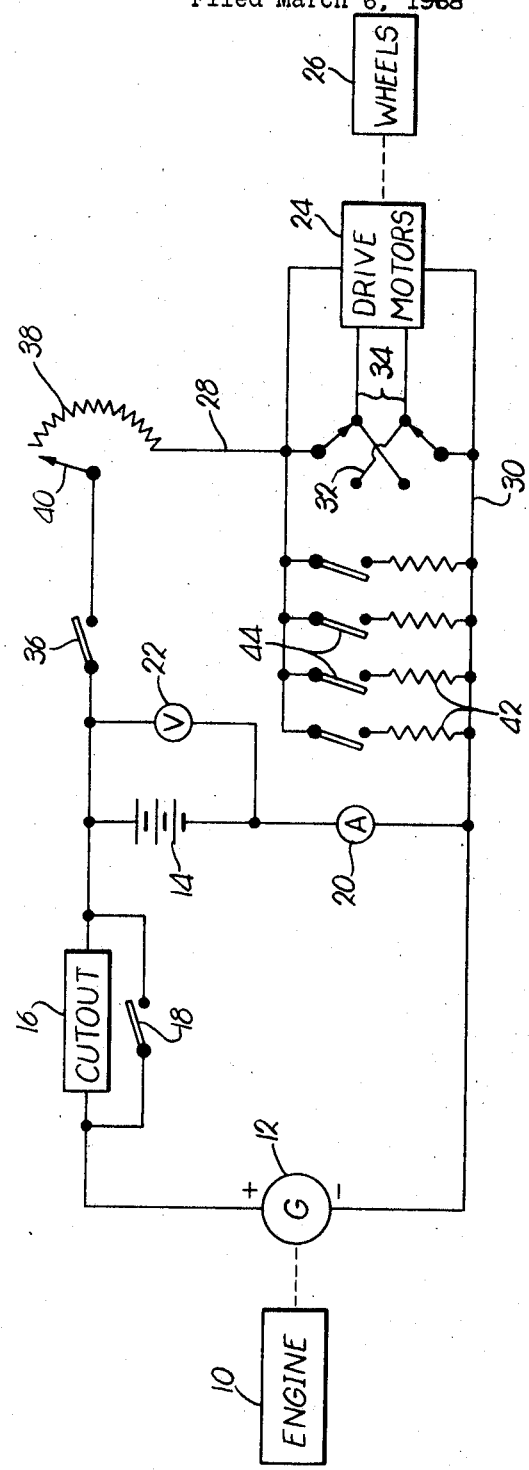

3,515,968
COMBINATION ELECTRIC AND INTERNAL COMBUSTION POWER UNIT FOR AUTOMOBILES
Francis W. Crawford, Manhattan, Kans., assignor to Kansas State University Research Foundation, Manhattan, Kans., a corporation of Kansas
Filed Mar. 6, 1968, Ser. No. 711,065
Int. Cl. B60l *11/12*
U.S. Cl. 318—139            1 Claim

ABSTRACT OF THE DISCLOSURE

A power plant for an automotive vehicle utilizes traction motors for driving the wheels or tracks, such motors being excited by a rechargeable battery or an electric generator driven by a relatively small internal combustion engine and connected in parallel with the battery. Surge demands in excess of the power available from the generator are supplied by the battery which discharges in response to such demands. The power of the engine is purposely limited to hold the generator to a maximum output level equal to the average power requirement of the motors plus the power required to charge the battery between surges. Thus, the engine-generator is capable of supplying the motors only under relatively low performance operating conditions such as would be encountered, for instance, in driving on a level road at moderate crusing speeds. Since the battery recharges between surges, the vehicle is provided with an extended operating range as compared with battery powered, all-electric vehicular power plants. The internal combustion engine may be operated at a relatively constant speed and designed for maximum efficiency of fuel combustion, thus pollution of the atmosphere by the exhaust from the engine is materially reduced as compared with vehicles powered solely by internal combustion engines. Electric brakes are provided by a dissipative load which is selectively connected to the drive motors for use when the latter are disconnected from the generator and battery and the vehicle is in motion.

---

The air pollution problem confronting many cities has led to the consideration of numerous means of pollution control both by the government and private industry. Regardless of the amount of industrial waste discharged into the air, every city, in approximately direct proportion to its size, is menaced by the pollutants produced by the internal combustion engines of automobiles, trucks, and other vehicles. Manifestly, as the size and number of vehicles and the horsepower of their power plants increases, the pollution problem from this source becomes more acute.

A proposed solution to the discharge of exhaust wastes from internal combustion engines is the conversion of a substantial portion of the automotive vehicles to electric power. This proposal is not without merit, it being evident that the electric powered automobile or truck would present no pollution problem and would be very clean in operation in all respects. However, at the present state of technology the all-electric automotive vehicle is impractical (except perhaps for very small commuter type automobiles) because of its short operating range on available battery power. The need to continually recharge the storage batteries of an electric automotive vehicle also inherently places limitations on the power of such vehicles, since increased performance necessitates increased battery drain and merely further compounds the problem of limited range mentioned above.

It is, therefore, the primary object of this invention to provide a power plant for an automotive vehicle which minimizes the discharge of pollutants into the atmosphere and, at the same time, provides a vehicle of acceptable range and performance.

As a corollary to the foregoing object, it is an important aim of the instant invention to provide a power plant as aforesaid which advantageously combines the attributes of electric power and internal combustion engine power to extend the range and raise the performance of the vehicle as compared with an all-electric power plant, yet materially reducing the contribution of the composite power plant to atmospheric pollution.

A further and important object of the invention is to provide such a combination power plant in which an internal combustion engine of reduced horsepower is employed having a relatively constant operating speed selected to provide efficient fuel combustion, and wherein motive power is supplied to the wheels or tracks of the vehicle by an electric motor or motors operated either by a generator driven by the engine or a battery which is charged by the generator during normal, low performance operation of the vehicle and which discharges to supply the motors with the required electrical energy under surge demands in excess of the power output of the generator.

Additionally, it is an important object to provide a combination power plant as aforesaid in which the drive motors may be utilized to supplement the action of the mechanical braking system of the vehicle, in which the generator is disconnected from the battery when the output voltage of the generator falls to a value less than the terminal voltage of the battery, and in which the generator may also serve as a starter motor for the engine to eliminate the need for a separate cranking motor.

In the drawing, the single figure is a diagrammatic and electrical schematic representation of the power plant of the instant invention.

An internal combustion engine 10 drives a direct current electric generator 12 across which a rechargeable battery 14 is connected through a cutout 16. A normally open starting switch 18 is connected in parallel with cutout 16 and, upon closure thereof, directly connects the positive side of the generator output to the positive terminal of battery 14. A zero centered direct current ammeter 20 is connected in series with the battery 14, and a voltmeter 22 is connected across the battery 14.

A direct current drive motor (or motors) 24 is mechanically coupled with the wheels or tracks 26 of the vehicle through a speed reduction transmission, if desired, to facilitate the use of high-speed machines. Although various motor arrangements may be employed in accordance with best practice in the adaptation of the power plant to a particular vehicle design, it is assumed herein for purposes of illustration that a pair of traction motors 24 are employed coupled with respective rear wheels 26 of a wheeled vehicle, the motors 24 being parallel connected across supply leads 28 and 30 extending from the parallel connected generator 12 and battery 14. The connections for series wound motors are illustrated, the supply leads 28 and 30 extending directly to the field windings of the motors and to a reversing switch 32 in the armature circuits of the motors. A pair of leads 34 connect the reversing switch 32 with the armature windings of the motors 24, the function of reversing switch 32 being to control the direction of rotation of the rotors of motors 24 and hence the direction of movement of the vehicle. It should be understood that the connections to reversing switch 32 are purely exemplary and that, if desired in a given application, the reversing switch could be connected in the field circuits rather than to the armature windings with the same effect insofar as the control of the direction of movement of the vehicle is concerned.

An off-on switch 36 (which may be key operated) is interposed in series with supply lead 28 and in series with a motor speed controller 38 illustrated as a variable resistor having a movable wiper 40. A bank of four resistors 42 is connected across supply leads 28 and 30 between controller 38 and the drive motors 24, each resistor being connected in series with a switch 44 shown in its open position.

In order to hold air pollution to a minimum, the size of the engine 10 is only sufficient to sustain the vehicle under relatively low performance operating conditions as will be discussed more fully hereinafter, plus enable the generator 12 to supply sufficient current to the battery 14 to effect recharging thereof. It is desired that engine 10 be as efficient as possible in the conversion of fuel to driving power in order to minimize the content of carbon monoxide, the oxides of nitrogen, unburned fuel, and other pollutants in the exhaust of the engine. For this reason, engine 10 is designed to operate at a relatively constant speed, or wtihin a limited range of speed, selected to provide the most efficient fuel combustion. Thus, the instant invention is readily adaptable to the use of engines that are less suitable for variable speed operation, such as diesels and gas turbines.

For purposes of illustration and to facilitate the explanation of the operation of the power plant, it is assumed that the power input requirement of the motors 24 is 150 HP under maximum performance operating conditions, and that the average power input requirement (total energy divided by time) of motors 24 during normal expected vehicle operation is 30 HP. Due to the many variables present in a predetermination of the average power for a given use of the vehicle, the average power figure should be sufficiently high to sustain the vehicle in relatively low performance operation, as in traveling on a level road at moderate cruising speeds.

Based on the above design parameters, the drive motors as a composite power unit would have a horsepower input rating of 150 and the engine 10 would have sufficient power to maintain the output voltage of generator 12 at the operating level of motors 24 under a 30 HP load. Additionally, generator 12 is selected to deliver an output voltage under a 30 HP or lesser load that is slightly above the full charge EMF of the battery 14. Thus, the battery 14 will charge or hold its charge as long as the power demand is 30 HP or less. Under surge demands in excess of 30 HP, as will be required for acceleration and hill climbing, the battery 14 discharges to furnish the needed electrical energy to motors 24.

The ammeter 20 serves to indicate the charge or discharge rate of the battery 14 and the voltmeter 22 is for the purpose of providing an index of the state of charge of the battery, if the latter is of a type having a charge responsive voltage characteristic. In particular, Edison cells have such a characteristic and, therefore, are susceptible to monitoring of their state of charge by this means. Other suitable types of batteries include the nickel cadmium type and lead storage cells.

The cutout 16 may comprise a polarized relay sensitive to reverse current flow and is provided for the purpose of disconnecting the generator 12 from the battery 14 when the generator output voltage falls to a value less than the terminal voltage of the battery 14 as, for example, when the engine is not running or is idling. Such conditions occur prior to starting and during starting of engine 10 and, additionally, if the engine is purposely shut down for all electric operation. This latter possibility is an important option in that it would enable vehicles equipped with the power plant of the instant invention to travel through tunnels or into indoor parking areas without discharging exhaust fumes into the enclosure. Engine shutdown under these circumstances could be effected in the customary fashion by providing a switch in the ignition circuit (not shown). In order to start the engine 10, switch 18 is closed to bypass the cutout 16 and operate generator 12 as a cranking motor for the engine.

Although a direct current generator 12 and DC motors 24 are illustrated herein, an alternator and AC machines could be used but would require the addition of a rectifier to charge the battery and an inverter to change the DC battery output to alternating current. Additionally, the inverter output would have to be synchronized and phased with the output of the alternator. Therefore, the DC system disclosed herein is preferred for its simplicity.

Although it is contemplated that suitable mechanical brakes would be employed to effect final stopping of the vehicle, the bank of resistors 42 and associated switches 44 enable the drive motors 24 to assist the mechanical brakes in stopping the vehicle. With the wiper 40 of controller 38 in the position shown where curernt flow to the motors 24 is interrupted, closure of one or more of the switches 44 places a dissipative load across the drive motors 24 that will now be operating as generators driven by the wheels 26 of the vehicle. The response of the braking action is inversely proportional to the resistance of the dissipative load; therefore, the response of the electric brakes increases as additional switches 44 are closed to increase the active number of resistors 42 in the parallel bank.

To further explain the control concept of the instant invention, an analogy with a conventional internal combustion engine powered vehicle is instructive. The on-off switch 36 corresponds to a clutch and could be mechanically associated with the same lever or pedal that actuates the reversing switch 32, the switch 36 being open when the lever or pedal is in the neutral position. The braking energy dissipator provided by the bank of resistors 42 may be operated by a brake pedal mechanically coupled with switches 44 in a manner to effect sequential closing thereof as the pedal is depressed, the number of switches 44 actually closed being a function of the travel of the pedal. This same pedal would also be linked to the mechanical brakes utilized to bring the vehicle to a final stop. The speed controller 38 corresponds to the throttle or footfeed but, of course, such footfeed in the instant invention has no connection with the separate controls that would be provided for the starting and operation of the engine 10.

If desired, the waste heat generated by the engine 10 and by the electric brake system may be utilized to heat the interior of the vehicle in cold weather for the comfort of the occupants. In warm weather the waste heat may be used to operate an absorption-desorption type refrigerator to air condition the passenger compartment.

Having thus described the invention, what is claimed as new and desired to be secured by Letters Patent is:

1. For use in a mobile, self-propelled, land vehicle having ground-engaging means adapted to be driven to propel the vehicle under differing load conditions including a first, normal, substantially constant load condition in which the vehicle is traversing substantially level terrain at a substantially constant, predetermined, normal cruising speed, a second set of lesser load conditions in which the vehicle is decelerating, traversing a downward incline or traversing substantially level terrain at a substantially constant speed less than said predetermined normal cruising speed, and a third set of greater load conditions in which the vehicle is accelerating, traversing an upward incline or traversing substantially level terrain at a substantially constant speed in excess of said predetermined normal cruising speed, improved power means adapted to provide an operating range under said first load condition that is limited only by the internal combustion fuel storage capacity of the vehicle and a predeterminedly optimized balance between maximum economy, efficiency and performance and minimum fuel consumption, wear deterioration and air pollution under all of said load conditions, said power means comprising:

(a) direct current electrical motor means on the vehicle adapted to be operably coupled with said ground-engaging means for driving the latter to propel the vehicle under any of said load conditions said motor means requiring a predetermined amount of electrical power to be supplied thereto for propelling the vehicle under said first load condition and lesser and greater amounts thereof, respectively for propelling the vehicle under said second and third sets of load conditions;

(b) rechargeable electric battery means on the vehicle adapted for the storage of electrical power therein in aggregate maximum amount insufficient to energize said motor means for propelling the vehicle under said first load condition for more than a limited period without recharging of said battery means;

(c) a direct current electric generator means on the vehicle adapted to be operated at a substantially constant speed presenting a substantially constant predetermined mechanical load or power requirement for the driving thereof and providing an available direct current electrical output therefrom of substantially constant voltage and maximum current characteristics constituting a source of available electrical power of predetermined amount sufficient to energize said motor means for propelling the vehicle under said first load condition or said second set of load conditions while simultaneously providing an excess of electrical current available for use in recharging said battery means, but of amount insufficient to energize said motor means for propelling the vehicle under said third set of load conditions;

(d) an electrical combustion engine on the vehicle operable at said substantially constant speed of operation of said generator means and operably coupled with the latter for driving said generator means;

(e) electrical circuit means for coupling said generator means, said battery means and said motor means in parallel;

(f) variable impedance means connected with said circuit means for adjustably controlling the amount of electrical power supplied to said motor means through said circuit means to control the mechanical power produced by said motor and adapted to be imparted to said ground-engaging means for propelling the vehicle under varying load conditions; and (g) cutout switching means connected with said circuit means and adapted for automatically disconnecting said generator means from said battery means whenever the voltage level of the power stored in said battery means exceeds the voltage of said output of said generator means, whereby said battery means is normally either being maintained at or restored to a fully charged state during operation of the vehicle under said first load condition and under said second set of load conditions, and the combined electrical power available from both said generator means and said battery means is available to energize said motor means during operation of the vehicle under said third set of load conditions.

References Cited

UNITED STATES PATENTS

| | | | |
|---|---|---|---|
| 2,107,844 | 2/1938 | Abbott | 290—25 |
| 2,653,841 | 9/1953 | Davies et al. | 290—17 |
| 2,683,850 | 7/1954 | Weber et al. | 320—25 |
| 3,182,742 | 5/1965 | Dow | 180—65 XR |
| 3,205,966 | 9/1965 | Landers | 290—14 XR |
| 3,367,438 | 2/1968 | Moore | 290—16 XR |

GLEN R. SIMMONS, Primary Examiner

U.S. Cl. X.R.

180—65; 290—16, 50; 320—25